May 22, 1928. 1,671,010
A. H. BRAECKLEIN
MASK
Original Filed Jan. 12, 1925 2 Sheets-Sheet 1
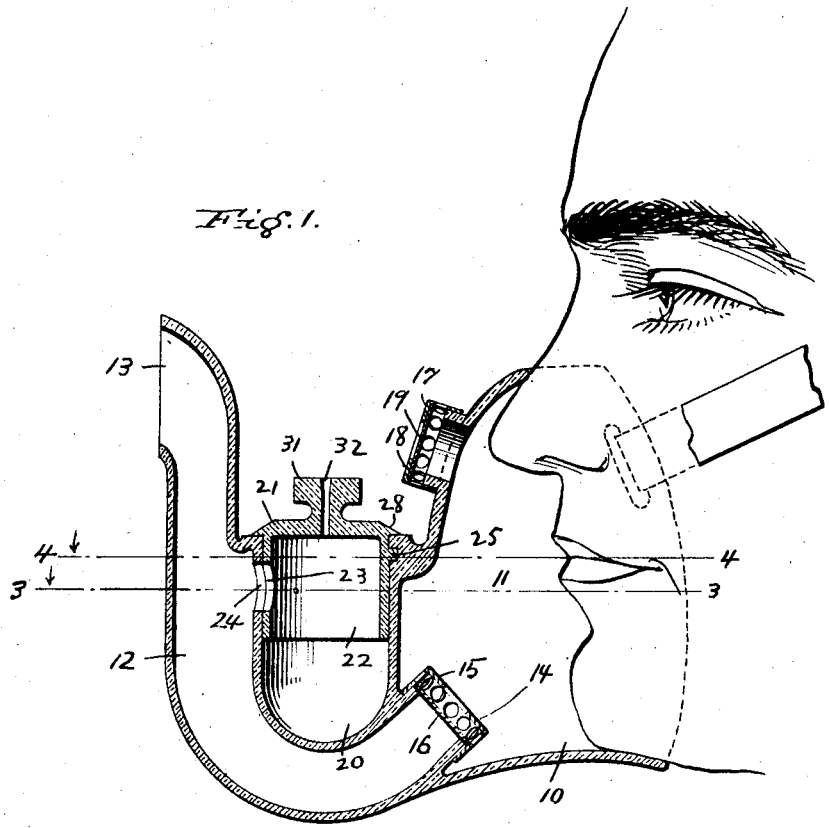
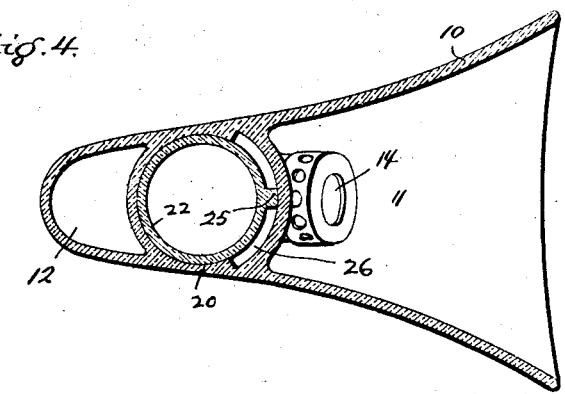

May 22, 1928.
A. H. BRAECKLEIN
MASK
Original Filed Jan. 12, 1925  2 Sheets-Sheet 2
1,671,010
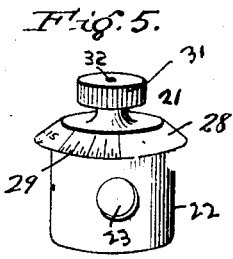
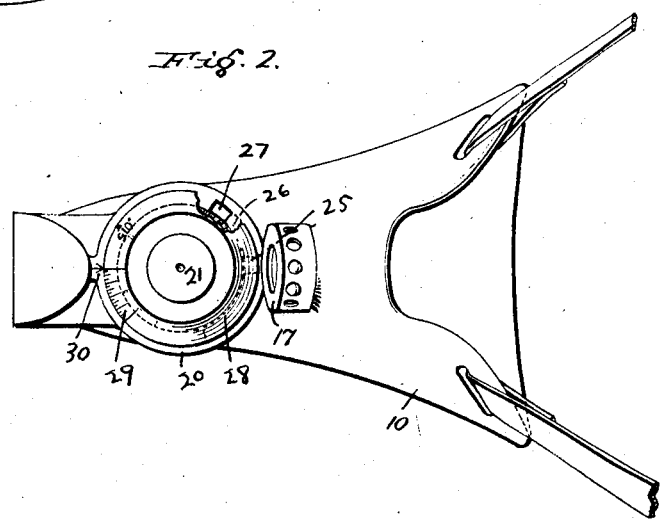
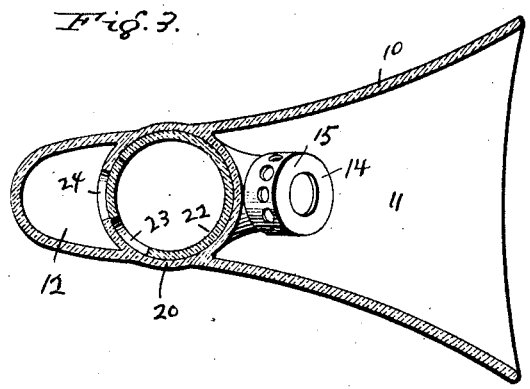
Alfred H. Braecklein
INVENTOR
BY Victor J. Evans
ATTORNEY
WITNESS:

Patented May 22, 1928.

1,671,010

UNITED STATES PATENT OFFICE.

ALFRED H. BRAECKLEIN, OF BALTIMORE, MARYLAND, ASSIGNOR, BY DIRECT AND MESNE ASSIGNMENTS, TO JOSEPH F. HINDES AND GEORGE ARNOLD FRICK, TRUSTEES, BOTH OF BALTIMORE, MARYLAND.

MASK.

Application filed January 12, 1925, Serial No. 2,026. Renewed October 10, 1927.

This invention relates to inhalers especially adapted to the use of chlorine gas mixed with air in the treatment of diseases of the respiratory passages.

In the use of chlorine gas and air for the treatment of colds, influenza, whooping cough and other respiratory diseases, the patient is placed in a closed room and a given number (for example 4200) litres of air mixed with chlorine gas, per minute, is distributed within the room, the purpose being to provide a concentration of 0.015 milligrams per litre, that being the amount best suited for the purpose. Should the concentration be much below 0.015 milligrams, it will prove ineffective, while a concentration above (for example 0.017 milligrams) causes irritation.

It is of course a relatively simple matter to introduce enough chlorine gas into a room to provide a concentration of 0.015 milligrams, but it is obvious that some of the gas will be absorbed by the walls, hangings and fittings of the room, as well as the clothing, hair and body of the patient, so that by the present method it is practically impossible to regulate the treatment so that the patient will receive an exact amount.

Another disadvantage of the present treatment resides in the fact that the patient must remain confined in a room for a long period of time for a single treatment.

The above and other disadvantages are overcome by the present invention in which the chlorine gas in measured quantities is mixed with air and administered so that the patient receives a definite amount at each treatment and receives it in regulated quantities without being confined within a closed room, so that the air mixed with the gas will be fresh instead of air breathed by a number of patients simultaneously receiving treatment, as is the case with the method of treatment now in vogue.

With the above and other objects in view, the invention further includes the following novel features and details of construction, to be hereinafter more fully described, illustrated in the accompanying drawings and pointed out in the appended claims.

In the drawings:—

Figure 1 is a sectional view showing an inhaler constructed in accordance with the invention, in position for use.

Figure 2 is a top plan view of the inhaler per se, a portion being broken away.

Figure 3 is a section on the line 3—3 of Figure 1.

Figure 4 is a similar view on the line 4—4 of Figure 1.

Figure 5 is a detail perspective view of the regulating valve.

Referring to the drawings in detail wherein like characters of reference denote corresponding parts, the reference character 10 indicates a mask which is shaped to fit closely about the face over the nose and mouth of a patient so as to provide a breathing chamber 11. Extending forwardly from the mask 10 is a conduit or passage 12 having an outer open end 13 for the admission of air. The conduit or passage 12 extends within the breathing chamber 11 and is provided with a check valve 14. This valve is in the form of a perforated cap 15 and a disk 16 which is located within the cap. This disk is adapted to rest upon the inner end of the conduit or passage 12 when the patient exhales so as to close the inner end of this passage, but is lifted from this seat when the patient inhales so as to establish communication between the passage and breathing chamber. The mask is provided with a check valve 17 which is similar to the valve 14 in that it consists of a perforated cap 18 and a movable disk 19, the latter acting to close the valve when the patient inhales and to open the valve when the patient exhales. The caps 15 and 18 of the valves may be removed and replaced when desired.

Located between the breathing chamber and the passage 12 is a container 20 which is provided with a removable closure 21. This closure includes a flange or skirt 22 which extends downwardly into the container 20 and which is provided with an opening 23, the latter being adapted to register with an opening 24 which provides communication between the container and the passage 12. The closure 21 is provided with a lug 25 which is movable within an arcuate recess or groove 26 provided adjacent the upper edge of the container, one wall of this groove being notched as shown at 27 in Figure 2 of the drawings so as to permit of the passage of the lug 25 for the purpose of removing or replacing the closure 21.

The closure includes a beveled flange 28 which is provided with graduations 29, the latter being adapted to be positioned with respect to a stationary indicator 30 for determining the relative positions of the openings 23 and 24.

The closure 21 is provided with a knurled knob 31 by means of which the said closure may be rotated, while an opening 32 extending through the closure provides a vent.

In the use of the invention, an ampoule of liquid chlorine gas containing a measured dose is placed within the container 20 and the mask arranged in position, the closure being positioned to allow a proper amount of the gas to pass from the container into the passage 12. This amount is determined by adjusting the closure 21 a distance determined by the graduations 29, the closure forming a valve for regulating the escape of the gas into the passage 12. Gas entering the passage 12 is mixed with air in said passage and enters the breathing chamber as the patient inhales, the valve 14 opening at each inhalation and the valve 17 closing with the positions of the valves reversed at each exhalation. The patient may thus walk about the house or into the air while under treatment and if desired may attend to his or her duties. By inserting a measured dose in the container, the patient receives only the proper amount at each treatment and this amount may be mixed with pure fresh air instead of closely confined air with a number of patients in a single room.

The skirt 22 is provided with an opening 33 which is spaced from the opening 23 and the beveled flange 28 is provided with indicia 0.015, directly above the opening 33, so that when this indicia registers with the mark 30, the said opening 33 will register with the opening 24. The size of the opening 33 is such that just the proper amount of gas may escape to provide an 0.015 concentration. This concentration may be varied by regulating the adjustment of the closure through the use of the graduations 29.

The invention is susceptible of various changes in its form, proportions and minor details of construction and the right is herein reserved to make such changes as properly fall within the scope of the appended claims.

Having described the invention what is claimed is:—

1. An inhaling device provided with a mask and comprising a cylindrical container, a tubular air inlet passing down one side of and around the bottom of said container and there communicating with the mask, said inlet and container having one wall in common, an opening in the side wall of said container toward said inlet substantially removed from the bottom of said container and communicating with said inlet, the lower part of said inlet thereby forming a circuitous mixing chamber.

2. An inhaling device provided with a mask and comprising an open top cylindrical container, a closure for said container, a tubular air inlet passing down one side of and around the bottom of said container and there communicating with the mask, said inlet and container having one wall in common, an opening in the side wall of said container toward said inlet substantially removed from the bottom of said container and communicating with said inlet, the lower part of said inlet thereby forming a circuitous mixing chamber.

In testimony whereof I affix my signature.

ALFRED H. BRAECKLEIN.